United States Patent Office 3,324,873
Patented June 13, 1967

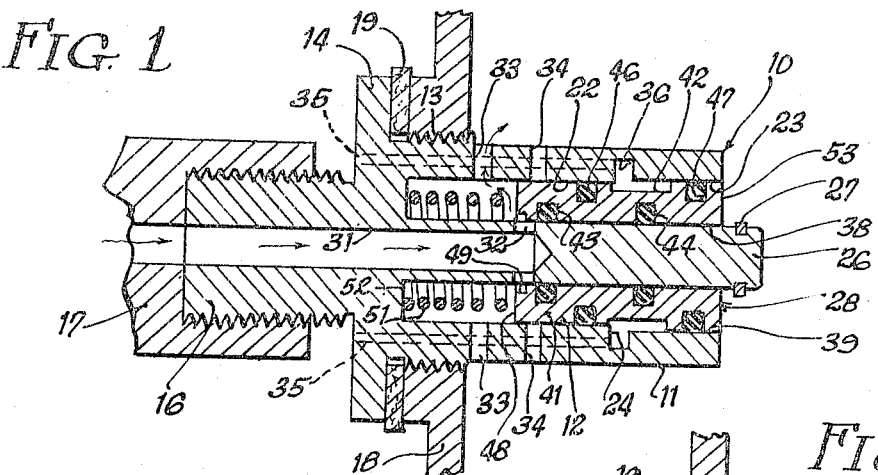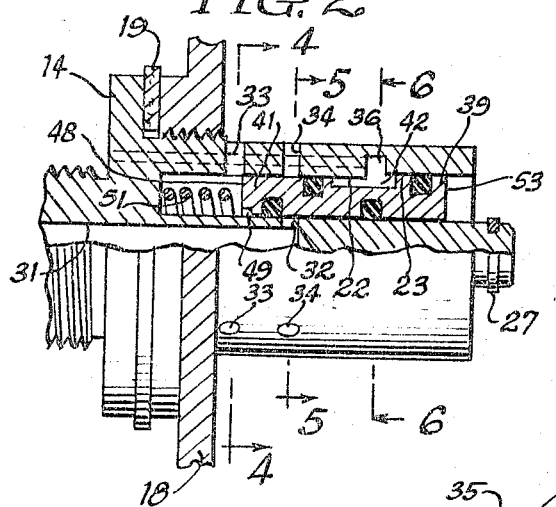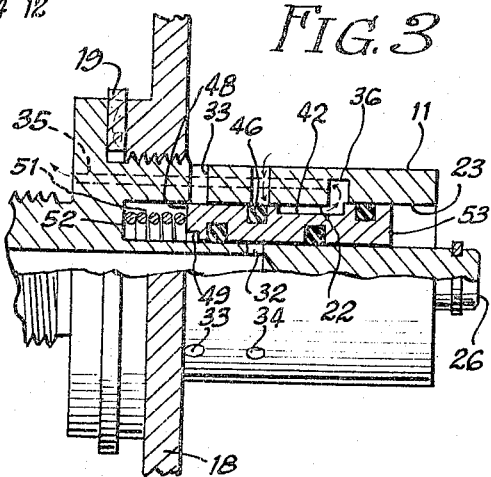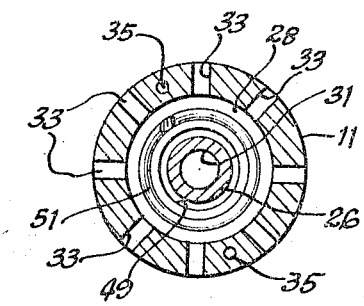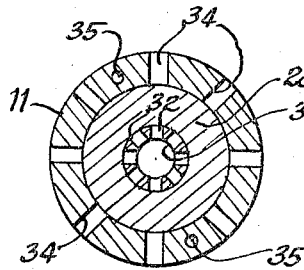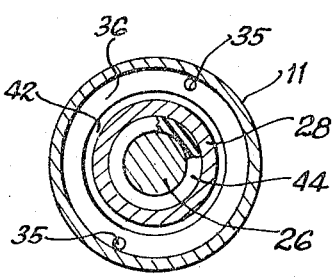

3,324,873
COMBINED PRESSURE REGULATOR AND RELIEF VALVE
Sam S. Trombatore, Des Plaines, Wilbur J. Bradtke, Park Ridge Manor, and William J. Griswold, Bridgeview, Ill., assignors to Webcor, Inc., Chicago, Ill., a corporation of Illinois
Filed July 27, 1964, Ser. No. 385,349
4 Claims. (Cl. 137—116.3)

This invention relates to a combination in-line pressure regulator and relief valve for pressure fluid systems.

One of the objects of our invention is the provision of a novel combination in-line pressure regulator and relief valve which is operative to regulate fluid pressure from a higher to a specific lower pressure with a high degree of accuracy.

Another object of this invention is the provision of a pressure regulator of the foregoing type which utilizes available fluid pressure in combination with a spring for balancing pressures within a system, thereby permitting the use of a relatively weak spring in relatively high pressure applications.

Another object of this invention is the provision of a pressure regulator of the aforesaid type which lends itself to miniaturization whereby a device in accordance with our invention comprises only a fraction of the weight and size of comparable prior art devices intended for operation under corresponding service conditions.

A further object of our invention is the provision of an in-line regulator and valve which may be housed within a low pressure reservoir tank and connected directly to a high pressure fluid supply line, thereby avoiding mounting of the regulator outside of the tank and the use of relatively complex piping and fittings required according to prior art installations.

Still a further object of our invention is the provision of a pressure regulator of the foregoing type having only one moving part and being operable to regulate a large volume of fluid with a minimal movement of the moving part.

Still a further object of this invention is the provision of a regulator and relief valve which is simple in construction, efficient in operation and economical to manufacture.

Other and further objects and advantages of this invention will become apparent from the following description when the same is considered in connection with the accompanying drawings, in which FIG. 1 is a vertical cross-sectional view of a combination in-line pressure regulator and relief valve, in accordance with our invention and illustrating the relationship of the parts under conditions where the reservoir tank pressure is less than the desired pressure and the system is open to admit additional pressure fluid into the tank.

FIG. 2 is an elevational view, partly in cross-section, illustrating the relationship of the parts under conditions where the reservoir tank pressure has reached a desired point and the system is closed against the admission of pressure fluid into the tank.

FIG. 3 is a view similar to FIG. 2 illustrating the relationship of the parts under conditions where the pressure in the reservoir tank is greater than the desired pressure and the parts are in condition to vent excess pressure from the tank to the atmosphere.

FIG. 4 is a cross-sectional view taken substantially on line 4—4 of FIG. 2.

FIG. 5 is a cross-sectional view taken substantially on line 5—5 of FIG. 2 and

FIG. 6 is a cross-sectional view taken substantially on line 6—6 of FIG. 2.

Referring to the drawings, the numeral 10 indicates a body having a generally cylindrical portion 11 having a cylindrical chamber 12. The body 10 is provided intermediately the ends thereof with threads 13 adjacent an intermediate flange 14. The body 10 is also provided with a reduced portion 16 having external threads for receiving the coupling nut of a conduit or line 17 supplying high pressure fluid. The device of our invention is intended to be installed in a reservoir tank 18 with the cylindrical portion 11 received within the tank and the threads 13 cooperating with the threads in an aperture in the tank wall. The flange 14 cooperates with a gasket 19 to effect a seal between the body 10 and the tank wall.

The chamber 12 includes two sections 22 and 23, with section 23 being somewhat larger in diameter than section 22 and there being an annular shoulder 24 at the circumferential meeting line of the two sections. The body 10 is provided with an integral cylindrical member 26 extending through the chambers 22 and 23 and in axial registration therewith. As will be seen by reference to the drawings, the member 26 projects beyond the cylindrical portion 11 and is provided with an annular groove to receive a C-washer 27 for the purpose of retaining a piston 28, presently to be described. The body 10 is provided with an axial bore or passage 31 which extends into the member 26. Said member is provided with a plurality of circumferentially spaced ports 32 which afford communication between the bore 31 and the chamber 22.

The body portion 11 is provided with a series of circumferentially spaced radial ports 33 which afford communication between the interior of the reservoir tank 18 and the chamber 22. A second series of radial ports 34, longitudinally spaced from the first series, is provided in the wall of the body portion 11 and these ports similarly afford communication between the chamber 22 and the interior of the tank 18. It will be noted that for convenience in machining the ports 34 are in co-planar registration with the ports 32. An annular groove 36 is provided in the inner wall surface of body portion 11, said groove being disposed so that one of its sides is coincident with the annular shoulder 24. A pair of drilled relief passages 35 extend longitudinally of the body 10 and afford communication between the annular groove 36 and the outside atmosphere.

A piston 28 is received within the chamber 12 for reciprocable movement therein. The piston is provided with a central bore 38 to accommodate the member 26 on which it is slidable. The piston is formed of a relatively larger diameter portion 39 which fits in chamber 23 and with a relatively smaller diameter 41 portion which fits in chamber 22. An annular recess 42 is provided in the peripheral wall of the piston, said recess separating the two portions 39 and 41 of the piston. The piston 28 is provided on its inner surface with annular grooves 43 and 44, each receiving an O-ring which effects a sealing engagement between the bore 38 of the piston and the member 26. On its surface the piston is provided with annular grooves 46 and 47 each receiving an O-ring which effects sealing engagement between the piston 28 and the respective chamber portions 22 and 23. The forward face 48 of the piston is provided with a counter bore 49 which affords a passage for fluid, as will be hereinafter explained. A coil spring 51 is circumposed about the member 26 and is interposed between the wall 52 and the forward face 48 of the piston. The spring 51 normally tends to urge the piston to the right, as seen in FIG. 1, and in normal non-operating position, the piston 28 assumes substantially the position illustrated in FIG. 1 with the passage 31 and ports 32 open to permit the entry of pressure fluid into the tank.

The pressure regulator and relief valve of our invention is intended to be mounted in a suitable aperture in the wall of a low pressure reservoir tank 18 which is intended for use as a supply of pressure fluid at a pressure substantially lower than the line pressure feeding into the tank. The body portion 11 is intended to be disposed within the reservoir tank while the threaded end 16 disposed exteriorly of the tank affords means for coupling a high pressure line to the regulator.

FIG. 1 illustrates the relationship of the parts when the pressure within the tank 18 is below a desired pressure and additional pressure fluid is required to be introduced into the tank in order to bring the pressure within the tank up to a desired point. In such condition pressure fluid will enter from the supply line 17 through the passage 31, will pass through ports 32, through the counterbore 49, through chamber 22, ports 33 and into the tank 18. It will be seen that pressure fluid is simultaneously acting on the forward and rearward faces 48 and 53 respectively of piston 28. It will be remembered, however, that because of the larger diameter of portion 39 the effective area on which pressure may act is greater on the rearward face 53 of piston 28 than on the forward face 48. Accordingly, the total pressure acting on the rearward face 53 will be greater than on the forward face 48 resulting in the piston 28 being caused to move to the left, as viewed in FIG. 1, in a direction to compress the spring 51. The spring, however, affords resistance to movement of the piston 28 and pressure fluid will continue to enter the tank through the passages and ports above described until sufficient pressure is built up within the tank to urge the piston to the left to assume the position illustrated in FIG. 2. This represents a balanced position where the pressure on the rearward face 53 of the piston equals the pressure on the forward face 48 of the piston plus the pressure of the spring 51. It will be noted that in this condition the relationship of the parts are as illustrated in FIG. 2 and that the ports 32 are closed by the piston 28 so that no pressure fluid may pass into chamber 22 and from there into the tank. It will be noted, however, that the ports 33 are open so as to afford communication between the chamber 22 and the interior of the tank. Thus, the pressure in chamber 22 is equal to that in the tank 18. As pressure fluid is withdrawn from tank 18 and the pressure in the tank is caused to drop, spring 51 will urge piston 28 to the right, as viewed in FIG. 2, effecting opening of ports 32 so that additional pressure fluid may pass into the tank. Thus, piston 28 will be caused to reciprocate, opening and closing ports 32, to maintain the pressure in the tank at a desired level and within a tolerance of plus or minus five percent.

In the event of an increase in pressure in the reservoir tank beyond a desired point due, for example, to expansion of the fluid within the tank or to failure of the spring 51, the pressure fluid within the tank will act on the rearward face 53 of piston 28 urging it to the left, to the position illustrated in FIG. 3, to a point where the annular groove 46 and O-ring therein move into registration with the ports 34 to effect communication therebetween. Accordingly, pressure fluid then may pass between the piston 28 and cylinder chamber 23, as illustrated by the arrows in FIG. 3, into the annular groove 42 which is now in communication with annular groove 36 which communicate with the relief passages 35. Thus, sufficient fluid will be vented from the reservoir tank until a balanced condition, as illustrated in FIG. 2, is again re-established. It will be understood that in the relationship illustrated in FIG. 3, the O-ring seals of the piston 28 straddle both sides of the ports 32 and accordingly, no pressure fluid will pass from the line into the tank during the venting interval. However, since the forward end of the piston 28 which overlaps the ports 33 is not provided with an O-ring seal, some leakage of pressure fluid will occur between said forward end and the chamber 22 and pressure fluid will enter into chamber 22 through ports 33 and will act on the forward face 48 of piston 28. When the pressure in the tank has been sufficiently lowered by venting, the piston 28 will be caused to move to the position illustrated in FIG. 2, representing a desired pressure condition within the tank.

It will be understood that in the event of failure of spring 51, resulting in the loss of the necessary balancing force for the piston 28 for normal operation, the piston will assume the venting position illustrated in FIG. 3, in which the admission of pressure fluid into the tank is cut off. Whatever pressure fluid is present in the tank will ultimately be vented to the atmosphere.

It will be apparent from the foregoing that the device of our invention affords a high degree of safety in operation and while it functions to effectively and accurately control and regulate the pressure within a reservoir tank upon failure of one of the parts the admission of pressure fluid into the tank is automatically cut off. Correspondingly, there is effected a venting of the tank to the atmosphere, thereby avoiding any possibility of a build up of dangerous pressure conditions within the tank.

We have found that with the use of commercially available springs we are able to regulate the end pressure within the reservoir tank to within a tolerance of five percent of predetermined desired pressure. We have also found that with the device of our invention we are enabled to regulate an inlet pressure from as high as 20,000 p.s.i. to a reservoir tank pressure substantially down to zero.

It will be noted that in the device of our invention spring pressure is used in combination with fluid pressure for effecting operation. Accordingly, since the spring affords only a differential pressure, the spring may have a relatively low spring rate. Consequently, the spring may be of relatively small size, even under conditions of relatively high pressure. For example, we are enabled to use a 30 pound spring to regulate pressures of approximately 1200 p.s.i.

The highly simplified and efficient construction of our device which employs only one moving part permits our device to be very readily and easily installed in a low pressure reservoir tank in direct connection with the inlet line and the tank itself so that the device is self contained within the tank and avoids the use of complex piping and fittings heretofore required for prior art devices. Further, the simplified construction permits the miniaturization of our device to the extend that a device, in accordance with our invention, intended for operation in a 150 p.s.i. system would weigh only six ounces compared to a prior art device of equivalent operating conditions weighing approximately two pounds.

Various changes coming within the spirit of our invention may suggest themselves to those skilled in the art; hence, we do not wish to be limited to the specific embodiments shown and described or uses mentioned, but intend the same to be merely exemplary, the scope of our invention being limited only by the appended claims.

We claim:

1. In combination with a reservoir tank, a pressure regulator and relief valve, adapted to be mounted in a wall of the tank and comprising (a) a cylinder structure including a cylinder chamber of relatively larger diameter communicating with a cylinder chamber of relatively smaller diameter, (b) there being an annular recess in the walls of said chamber substantially at the circumferential meeting line thereof (c) said cylinder structure having a relief passage affording communication between said recess and the exterior of the tank, (d) a cylindrical member fixed in said chambers and extending coaxially thereof, (e) said cylindrical member having an axial passage and an inlet port affording communication between said passage and said smaller diameter cylinder chamber, (f) means associated with said cylinder structure affording connection to a conduit carrying high pressure fluid whereby pressure fluid is admitted into said passage, (g) said cylinder structure having first and second ports spaced from each other longitudinally of said cylinder structure and affording communication between said smaller diameter cylinder chamber and the tank interior, (h) a unitary annular piston including a first portion having a relatively smaller diameter and a second portion having a relatively larger diameter, each operating in a respective cylinder chamber, (i) said piston being slidable on said cylindrical member to open or close said inlet port, (j) said piston having a circumferential recess between said first and second portions, (k) spring means circumposed about said cylindrical member and arranged to abut the face of the first portion of the piston to resist movement of the piston, (l) said piston when the pressure in said reservoir tank exceeds a predetermined point being caused to move in a direction to close said inlet port, thereby to shut off the flow of pressure fluid into said reservoir tank to effect communication between said second port and said annular recesses whereby excess pressure fluid from said tank may vent through said relief passage.

2. In combination with a reservoir tank, a pressure regulator and relief valve adapted to be mounted in a wall of the tank and comprising (a) a cylinder structure including a cylinder chamber of relatively larger diameter communicating with a cylinder chamber of relatively smaller diameter, there being an annular recess in the walls of said chamber substantially at the circumferential meeting line thereof, (b) said cylinder structure having a relief passage affording communication between said recess and the exterior of the tank, (c) said cylinder structure having an axial passage and an inlet port affording communication between said passage and said smaller diameter cylinder chamber, (d) means connecting said passage to a supply of pressure fluid, (e) said cylinder structure having first and second ports spaced from each other longitudinally of said cylinder structure and affording communication between said smaller diameter chamber and the tank interior, (f) a piston including a portion having a relatively larger diameter and a portion having a relatively smaller diameter, each operating in a respective cylindrical chamber, (g) said piston being slideable to open and close said inlet port, (h) said piston having a circumferential recess between said first and second portions, (i) spring means biasing said piston in a direction to maintain said inlet port open whereby pressure fluid may pass from said supply of pressure fluid through said passage and said first chamber into said tank reservoir, (j) said piston being caused to move in a direction to close said inlet port when the pressure in said tank attains a predetermined point thereby to shut off the flow of pressure fluid into said reservoir, (k) said piston being cause to move in a direction to effect communication between said recesses, said second port and said relief passage when the pressure in said tank exceeds a certain point whereby to vent excess pressure fluid.

3. In a combination with a reservoir tank a pressure regulator and relief valve adapted to be mounted in a wall of the tank and comprising a body having a (a) cylindrical chamber and an annular recess therein, (b) said body having first and second ports affording communication between said chamber and the tank interior, (c) a piston reciprocable in said chamber and having opposed end faces having relatively different effective areas on which pressure fluid may act, (d) said piston having an annular recess intermediate the end faces thereof, (e) spring means acting against the face of the piston having the relatively smaller area to balance the pressure differential on the opposite face of said piston, (f) said body having first passage means and an inlet port communicating with said chamber, (g) means connecting said passage to a supply of pressure fluid, (h) said body having a relief passage communicating with said first mentioned recess and opening to the atmosphere, (i) said piston when the pressure in said tank exceeds a predetermined point being caused to move in a direction to close said inlet port thereby to shut off the flow of pressure fluid into said tank reservoir and to effect communication between said second port and said recesses whereby excess pressure fluid from said tank may vent through said relief passage.

4. In combination with a reservoir tank, a pressure regulator and relief valve adapted to be mounted in a wall of the tank and comprising, (a) a body having a first cylindrical chamber and a second cylindrical chamber, both axially aligned and in communication with each other, (b) said second cylindrical chamber being larger in diameter than said first cylindrical chamber and opening into the tank interior, (c) an annular piston reciprocable in said chamber and having opposed end faces having different effective areas on which pressure fluid may act and each operative in a respective cylindrical chamber, (d) said piston having annular passage means, (e) a cylindrical member fixed in said chambers and extending coaxially thereof, (f) said cylindrical member having a passage and an inlet port opening into said first cylindrical chamber, (g) means connecting said passage to a supply of pressure fluid, (h) said body having passage means venting to the atmosphere, (i) spring means acting against the piston face having the relatively smaller area to balance the pressure differential on the opposite face of said piston, (j) said body having first and second ports spaced from each other longitudinally of the said body and affording communication between said first cylindrical chamber and the tank interior, (k) said spring means biasing said piston in a direction to maintain said inlet port open whereby pressure fluid may pass from said supply line through said passage and said first chamber into said tank reservoir, (l) said piston when the pressure in said tank exceeds a predetermined point being caused to move in a direction to close said inlet port thereby to shut off the flow of pressure fluid into said tank reservoir and to effect communication between said second port and said passage means whereby excess pressure fluid from said tank may vent through said relief passage.

References Cited

UNITED STATES PATENTS

| | | | |
|---|---|---|---|
| 2,089,144 | 8/1937 | Work | 137—116.5 |
| 3,067,770 | 12/1962 | Francher | 137—493 |

WILLIAM F. O'DEA, *Primary Examiner.*

D. DONOVAN, *Assistant Examiner.*